United States Patent [19]

Gindre et al.

[11] Patent Number: 5,064,153
[45] Date of Patent: Nov. 12, 1991

[54] SYSTEM FOR DETERMINING THE DEPLETION OF PROPELLANT TANKS ONBOARD A SPACECRAFT

[75] Inventors: Philippe Gindre, Leiderdorp; Peter Hähnel, Oegstgeest; Hartmut Helmke, Leiden, all of Netherlands

[73] Assignee: Agence Spatiale Europeenne

[21] Appl. No.: 396,422

[22] Filed: Aug. 21, 1989

[30] Foreign Application Priority Data

Aug. 22, 1988 [FR] France ............................ 88 11236

[51] Int. Cl.$^5$ ............................................. B64G 1/40
[52] U.S. Cl. ................................... 244/172; 137/154; 137/607; 244/135 R
[58] Field of Search ............ 73/290 R, 290 V, 290 B; 55/38, 159; 137/154, 606, 607; 220/501, 530; 244/135 R, 172, 158 R

[56] References Cited

U.S. PATENT DOCUMENTS

| 3,389,602 | 6/1968 | Clemens | 73/290 R |
| 4,743,278 | 5/1988 | Yeh | 137/154 X |
| 4,768,541 | 9/1988 | Uney et al. | 137/154 |
| 4,898,030 | 2/1990 | Yeh | 244/135 R X |

Primary Examiner—Brian S. Steinberger
Attorney, Agent, or Firm—Toren, McGeady & Associates

[57] ABSTRACT

A system in which a surface tension device is connected at the outlet of the propellant tanks, said surface tension device having surface tension gas barrier means, the presence of gas bubbles at the inlet of said surface tension device is detected and a detect signal is produced, said detect signal indicating that the propellant tanks are empty. The detect signal then causes the spacecraft thrusters to be fed from an auxiliary propellant tank. The latter can be implemented inside a main propellant tank.

5 Claims, 2 Drawing Sheets

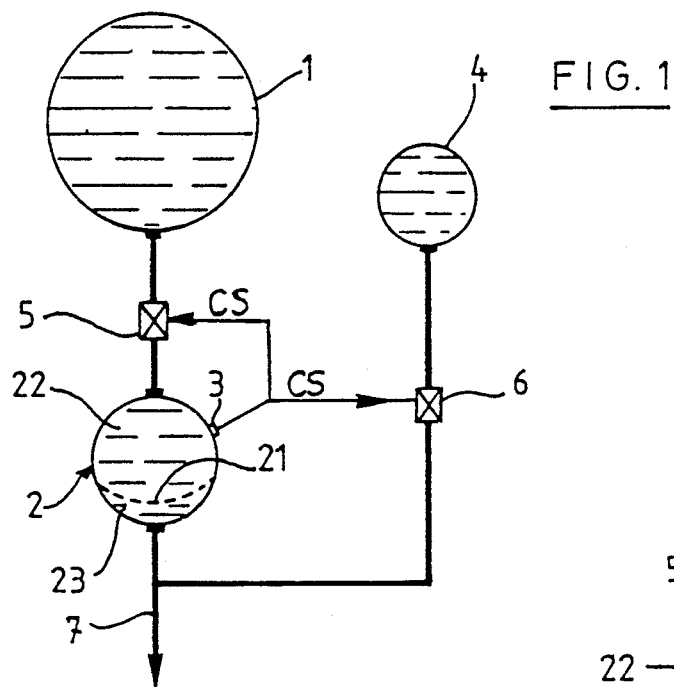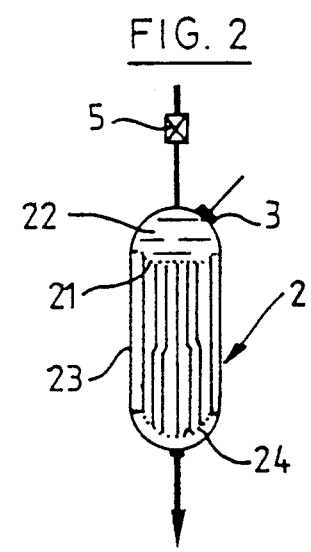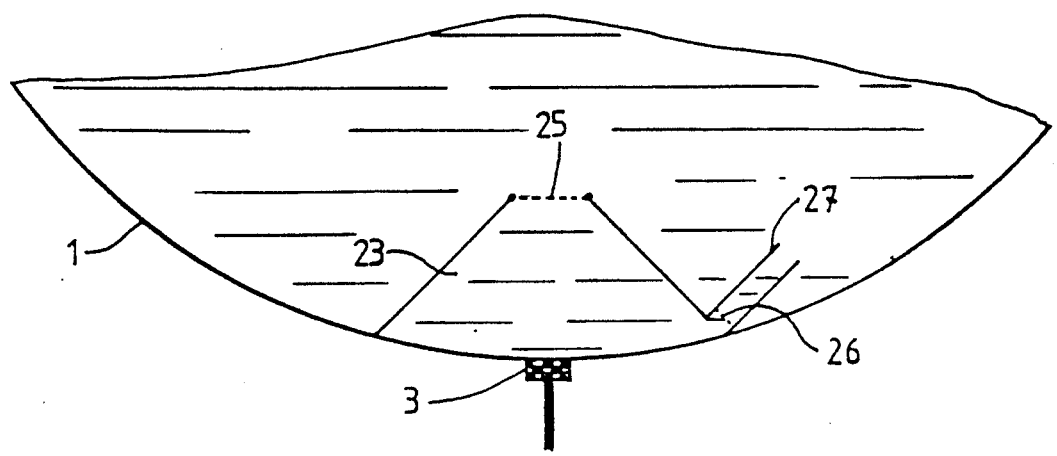

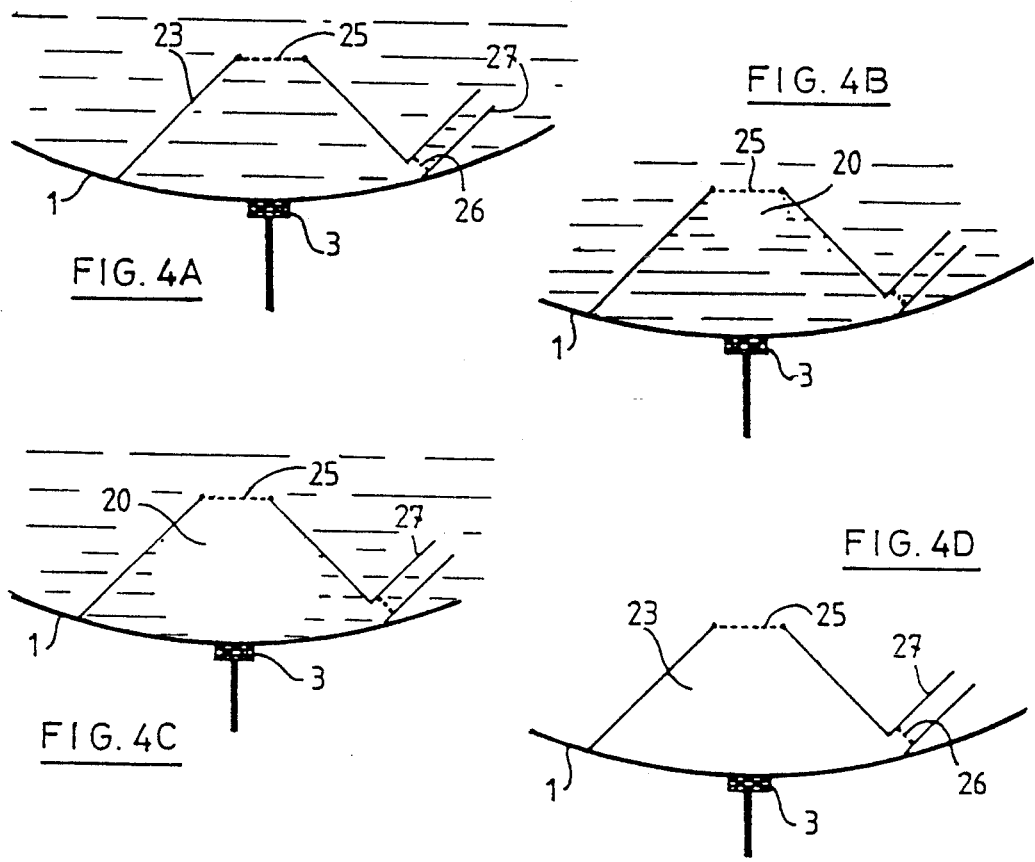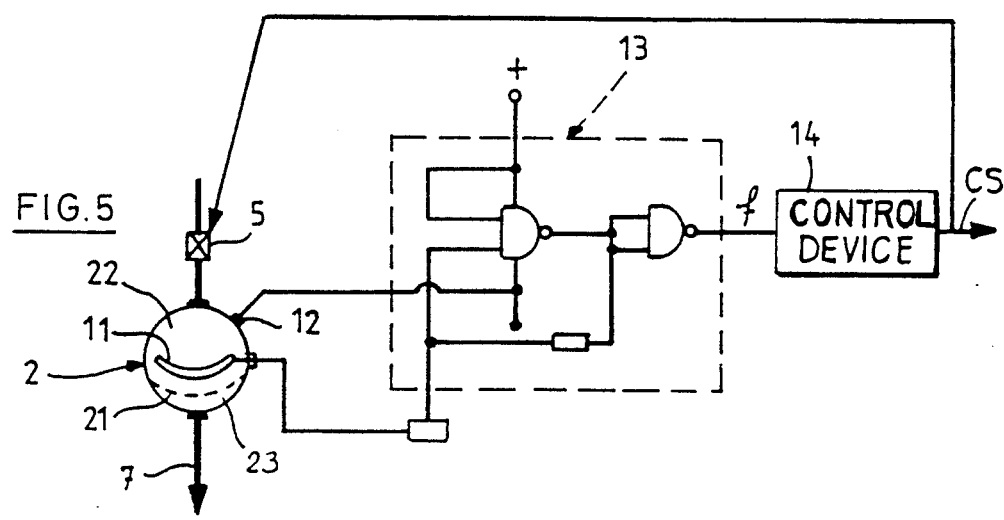

SYSTEM FOR DETERMINING THE DEPLETION OF PROPELLANT TANKS ONBOARD A SPACECRAFT

FIELD OF THE INVENTION

The present invention relates to a system for determining and signaling when the propellant mass contained in the tanks onboard a spacecraft in orbit reaches down to a predetermined small amount.

BACKGROUND OF THE INVENTION

The knowledge of the amount of residual propellant available onboard a spacecraft is of prime importance to optimize the use of the spacecraft and more particularly at the end of the spacecraft mission in order to decide whether re-orbit manoeuvres can be performed with a view to placing the spacecraft into a new orbit.

Establishing the quantity of the remaining propellant in the tanks of a spacecraft has been a constant endeavour since the launch of active spacecrafts and different methods have been proposed to that purpose. These known methods generally provide good results in so far as the measurements are performed in a gravity environment of space because it is no longer possible in that case to know with a good accuracy where exactly the propellant is located in the tanks.

The most currently used methods are based on gas law and consist in performing pressure and temperature measurements. The method which gives the best accuracy consists in recording the amount of propellant consumed during a given time period and substracting this amount from the initial contents of the propellant tanks. Such a method gives satisfactory results when applied on short life spacecrafts but it requires the knowledge of the initial propellant mass available. This initial mass can be established in mono-propellant propulsion systems, but however it is a more difficult problem in a bi-propellant propulsion system for the reason that the proportions of the components in the mixing are not known with accuracy.

Another known method, which has been proposed by the applicant, consists in measuring the pressurant gas pressure and using the residual gas to repressurize the propellant tanks. This known method will allow an estimation of the residual amount of propellant to be made with a great accuracy, even in the case of a bi-propellant propulsion system. However, the pressure measurement can be performed at any time during a spacecraft mission and it cannot be guaranteed that, at the time the measurement is performed, there is at least enough propellant in the tanks for re-orbit manoeuvring. In order to place a geostationnary spacecraft into a new orbit, an amount of propellant is required to raise the altitude of the spacecraft. For example, a rough estimate of the propellant necessary to raise the altitude of an Olympus type satellite by 100 km is 1.5 kg approximately. This propellant mass is much smaller than the total amount loaded prior to launch. In order to prevent the risk of prematurely terminating the commercial use of a spacecraft with a view to optimize its performance capabilities, it is essential to get an accurate control of the mass of residual propellant at the end of the operational life of the spacecraft. The present invention seeks to solve the problem as outlined above.

SUMMARY OF THE INVENTION

It is an object of this invention to provide a system in which a surface tension device is connected at the outlet of the propellant tanks, said surface tension device having surface tension gas barrier means, and in which the presence of gas bubbles at the inlet of said surface tension device is detected for producing a signal indicating that the propellant tanks are empty, said signal being used to connect an auxiliary propellant tank for feeding the spacecraft thrusters.

In accordance with an exemplary embodiment, the surface tension gas barrier means are implemented by using a tank including a fine mesh grid for subdividing the tank inner volume into two compartments, connecting the first compartment to the outlet of the main propellant tanks, connecting the second compartment to a propellant line for feeding the spacecraft thrusters, and providing sensor means for detecting the presence of gas bubbles in the first compartment.

According to a particular aspect of the invention, the surface tension barrier means are implemented by forming an inner compartment inside the propellant tank, providing a first fine mesh grid for separating the inner compartment from the main volume of the propellant tank, providing a second fine mesh grid for separating the inner compartment from the tank outlet, the second grid having a finer mesh than the first grid.

According to another aspect of the invention, there is provided sensor means on the outer wall of the inner compartment for detecting the presence of gas in said inner compartment and produce a detect signal indicating that the propellant tanks are almost empty.

In accordance with a further aspect of the invention, there is provided an auxiliary propellant tank inside a main propellant tank, and connecting the outlet of the inner compartment to the auxiliary propellant tank.

According to a further particular embodiment of the invention, there is provided an insulated first electrode inside said first compartment, using the wall of the surface tension device as a second electrode, connecting the first and second electrodes into an oscillator circuitry, whereby the propellant contained in said compartment is used as a dielectric for the electric capacitor formed by the first and second electrodes and whereby the variation of the oscillator frequency represents the appearance of gas bubbles in said compartment.

Another object of this invention is providing an installation for feeding propellant to the thrusters of a spacecraft, said installation being arranged for carrying out the method as set forth above.

These and other objects and features of the invention will become apparent from the specification which follows and from the accompanying drawings described therein.

BRIEF DESCRIPTION OF THE DRAWINGS

FIG. 1 is a schematic representation of a propellant feed system used onboard a spacecraft for carrying out the method according to the invention.

FIG. 2 represents a first embodiment of a device for use in the system of the invention.

FIG. 3 represents a second embodiment of a device for use in the system of the invention.

FIG. 4 illustrates the progressive accumulation of gas in the device of FIG. 3.

FIG. 5 is a schematic diagram of an exemplary detection device for use in the system of the invention.

DESCRIPTION OF EXEMPLARY EMBODIMENTS

Referring to FIG. 1 there is shown a spacecraft propellant tank labelled 1 and an auxiliary propellant tank labelled 4. The reference numerals 5 and 6 denote valves and the reference numeral 7 denotes a propellant line for feeding the spacecraft thrusters. The propellant tank 1 is supposed to be equipped with a surface tension propellant management device known per se (not represented in the drawings). The principle of the method according to the invention is to detect the presence of bubbles of pressurant gas at the tank outlet and to then allow the spacecraft thrusters to be fed from the auxiliary propellant tank 4 which contains propellant enough to allow re-orbit manoeuvres to be performed for placing the spacecraft into a new orbit.

In accordance with this invention, a surface tension device 2 is connected at the outlet of the propellant tank 1 for serving as a gaz barrier for the pressurant gas. The surface tension device is comprised of a small tank 2 including a fine mesh grid 21 (e.g. a 10 microns mesh screen) which sub-divides the tank 2 into two compartments 22 and 23. In normal use, the compartments 22 and 23 are full of liquid propellant coming from the propellant tank 1. The pressure exerted by the pressurant gas in the compartment 22 causes the liquid to flow first through the grid 21 and when there is no longer liquid in contact with the grid 21 on its upstream side, then the gas also flows through the grid 21 and enters compartment 22. A sensor 3, which may be of any type, is provided to detect when gas bubbles coming from the propellant tank 1 accumulate in compartment 22.

The sensor 3 can be comprised of any device capable of producing an electric signal when detecting the presence of gas bubbles in the compartment 22. Various embodiments for the sensor 3 are known in the art thermal, capacitive, ultrasonic, acoustic types, etc. An exemplary typical embodiment will be described later herein.

The electric signal produced by the sensor 3 is used to control the closure of valve 5 and the opening of valve 6 provided in the propellant line connected at the outlet of the auxiliary tank 4. The propellant contained in the auxiliary tank 4 then is allowed to flow into the propellant line 7 for feeding the spacecraft thrusters. As the content of the auxiliary tank 4 is known, the moment when the sensor 3 detects the presence of gas in the compartment 22 indicates that the spacecraft still contains the necessary propellant for re-obit manoeuvring.

The surface tension device 2 provided in accordance with the invention can be implemented in a number of various embodiments. FIG. 2 schematically depicts an exemplary embodiment in which the compartment 23 is used itself as an auxiliary propellant tank. The pressurant gas accumulates in the compartment 22 before to flowing through the grid 21 and the presence of gas bubbles in the compartment 22 is detected by a sensor 3 or a detector of any type. When gas bubbles are so detected in the compartment 22, the compartment 23 still contains the necessary propellant for allowing the spacecraft to perform re-orbit manoeuvres. The outlet of the tank 2 feeds the propellant line 7 through a usual filter 24.

Another exemplary embodiment of the surface tension device according to the invention is represented in FIG. 3. The device as shown makes use of capillary properties of very fine meshes and is implemented inside the propellant tank 1 itself. In the tank 1 there is provided a small conical shape compartment 23 which is separated from the main volume of the tank 1 (i.e. from the bulk propellant) by a fine mesh grid 25 (e.g. a 20 microns mesh screen). The compartment 23 is also connected to the propellant management device (known per se) through a very fine mesh grid 26 (e.g. a 10 microns mesh screen) and line 27.

As a result of the different capillarities of the grids 25 and 26, the pressurant gas flows through grid 25 and enters progressively into compartment 23 only when the main volume of tank 1 is empty. Once compartment 23 no longer contains any propellant, gas bubbles can creep through the finer mesh 26 and enter the line 27. FIGS. 4A–4D illustrate some typical steps in the process of gas accumulation in the compartment 23. FIG. 4A shows the compartment 23 full up with liquid propellant. FIG. 4B shows a gas pocket 20 having been formed in the compartment 23. In FIG. 4C the gas pocket has growed and fills almost the whole volume of compartment 23. In FIG. 4D the compartment 23 is full up with pressurant gas. A sensor 3 of any type is provided to detect the moment when the compartment 23 is full with gas. The embodiment of FIG. 3 makes it possible to implement the auxiliary propellant tank inside the main propellant tank 1 itself, with said auxiliary tank being connected to line 27.

As explained in the foregoing, gas bubbles appearing in the surface tension device of the invention is sensed by a sensor represented at 3 in FIGS. 1, 2 and 3. Said sensor can be implemented in various embodiments. An exemplary embodiment is described hereafter with reference to FIG. 5. In this Figure there is shown a surface tension device 2 similar to the device represented in FIG. 1. The tank 2 is subdivided into two compartments 22 and 23 by a fine mesh grid 21. An insulated electrode 11 is mounted in the compartment 22 for forming an electric capacitor with the wall 12 of the tank. The liquid propellant contained in the compartment 22 serves as the dielectric for said capacitor. The electrode 11 can be implemented in various embodiments and it can be shaped so as to be adapted to the shape of the tank 2. In FIG. 5 the electrode 11 is shown as a curved plate.

The electric capacity of the capacitor so formed in the tank 2 is a combination of the parasitic capacity of the tank 2, a fixed capacity of the electrode assembly and the electric capacity of electrode 11 to the wall 12 of the tank. When the electrode 11 is covered with liquid, the capacity of said capacitor has a first value which causes the oscillator 13 to generate a first frequency. When gas enters compartment 22 and reaches the electrode 11, the capacity of the capacitor 11–12 is varying as a result of the change in the dielectric. The capacity variation results in the oscillator frequency being changed quickly and significantly. A control device capable of measuring the oscillator frequency is thereby able to detect the capacity variation and consequently the moment when the main propellant tank (connected upstream of valve 5) is empty. The control device 14 in FIG. 5 which is connected at the oscillator output is arranged to measure the oscillator frequency and, in response thereto, produce a control signal for closing valve 5 in order to prevent gas to flow to the spacecraft thrusters and for opening the outlet valve of the auxiliary tank thereby to allow said auxiliary tank to feed the thrusters.

The detection accuracy is related to the oscillator frequency and the reliability of detection in time only depends on the oscillator stability. An oscillator operating in a frequency range up to 100 kHz approximately has proven to provide a satisfactory accuracy of detection. The oscillator 13 can be a simple Schmitt trigger integrated circuit for instance. The measuring and control device 14 can be any device within the normal skill of a man of the art.

Although there has been described hereinbefore particular embodiments in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

We claim:

1. A method for determining when a main propellant tank of a spacecraft is empty and for initiating propellant feed from an auxiliary propellant tank for placing the spacecraft into a new orbit, the method comprising the steps of:
    connecting a surface tension device to an outlet of the main propellant tank;
    detecting gas bubbles appearing at an inlet of the surface tension device;
    producing a depletion detect signal in response to the detecting of gas bubbles; and
    controlling a valve at an outlet of the auxiliary propellant tank by using the depletion detect signal, for feeding a sufficient amount of propellant to place the spacecraft in a new orbit.

2. A method as defined in claim 1, including using a tank having a fine mesh grid for sub-dividing the tank inner volume into two components, connecting the first of said compartments to the outlet of the main propellant tank, connecting the second of said compartments to a propellant line for feeding the spacecraft, and providing sensor means for detecting the presence of gas bubbles in said first compartment.

3. A method as defined in claim 2, including using said second compartment as an auxiliary propellant tank having a predetermined content sufficient for allowing the spacecraft to manoeuvre into a new orbit.

4. A method as defined in claim 2, and further comprising the step of providing an insulated first electrode inside said first compartment, using the wall of the surface tension device as a second electrode, connecting said first and second electrodes into oscillator circuit means, whereby the propellant contained in said compartment is used as a dielectric for an electric capacitor of said first to said second electrodes and whereby a variation of frequency of the oscillator circuit means represents an appearance of gas bubbles in said compartment.

5. An arrangement for feeding propellant to thrusters of a spacecraft, comprising:
    at least one main propellant tank;
    an auxiliary propellant tank;
    a surface tension device connected to an outlet of the at least one main propellant tank;
    means for detecting gas bubbles appearing at an inlet of the surface tension device;
    means for producing a depletion detect signal in response to detection of gas bubbles by said detecting means; and
    means for controlling a valve at an outlet of the auxiliary propellant tank by using the detect signal, so that a sufficient amount of propellant is fed to the thrusters to place the spacecraft in an new orbit.

* * * * *